United States Patent [19]
Auger et al.

[11] Patent Number: 6,094,425
[45] Date of Patent: Jul. 25, 2000

[54] SELF-ADAPTIVE METHOD FOR THE TRANSMISSION OF DATA, AND IMPLEMENTATION DEVICE

[75] Inventors: Gérard Auger, Champagne sur Oise; Olivier Bacelon, Paris, both of France

[73] Assignee: Thomson-CSF, Paris, France

[21] Appl. No.: 09/009,883

[22] Filed: Jan. 21, 1998

[30] Foreign Application Priority Data

Jan. 21, 1997 [FR] France ................................. 97 00588

[51] Int. Cl.[7] ........................................................ H04J 3/16
[52] U.S. Cl. ............................................ 370/330; 375/202
[58] Field of Search .................................... 370/319, 330, 370/343, 344, 478, 480, 481, 436; 455/453, 450, 451, 452; 375/202

[56] References Cited

U.S. PATENT DOCUMENTS

| 4,866,710 | 9/1989 | Schaeffer | 370/330 |
| 4,945,312 | 7/1990 | Auger et al. | |
| 5,109,527 | 4/1992 | Akerberg | 455/33.2 |
| 5,307,509 | 4/1994 | Michalon et al. | |
| 5,504,750 | 4/1996 | Fulghum et al. | |
| 5,579,306 | 11/1996 | Dent | 370/330 |
| 5,920,571 | 7/1999 | Houck et al. | 370/458 |
| 5,963,865 | 10/1999 | Desgagne et al. | 455/450 |

FOREIGN PATENT DOCUMENTS

| 0 680 168 A2 | 11/1995 | European Pat. Off. |
| 0 744 846 A1 | 11/1996 | European Pat. Off. |
| 33 37 648 A1 | 2/1987 | Germany |
| 44 32 926 A1 | 3/1996 | Germany |
| WO 92/06546 | 4/1992 | WIPO |

Primary Examiner—Douglas W. Olms
Assistant Examiner—Ken Vanderpoye
Attorney, Agent, or Firm—Oblon, Spivak, McClelland, Maier & Neustadt, P.C.

[57] ABSTRACT

A dynamic and decentralized self-adaptive method and system including allocation of all time/frequency resources available at a given moment to as many requesting mobile units as are necessary. Transmission between stations is performed by allocation of frequencies. For each frequency allocated, the transmissions are grouped in slots forming frames in a time/frequency space. Each frame includes n slots of a same duration and a same width. The method includes using the allocated transmission frequencies and the frames for each transmission from a station by occupancy of one and the same number of slots according to a modulo p operation. A search is made, during a monitoring procedure, for free slots to determine parameters of occupation of a transmission as a function of the state of occupancy of the frames of the time/frequency space existing before the transmission. With the noted method and system, simultaneous operation of a large number of stations, without planning, initial data or centralized management, while at the same time maintaining compatibility with waveforms of conventional systems and methods, is enabled.

58 Claims, 3 Drawing Sheets

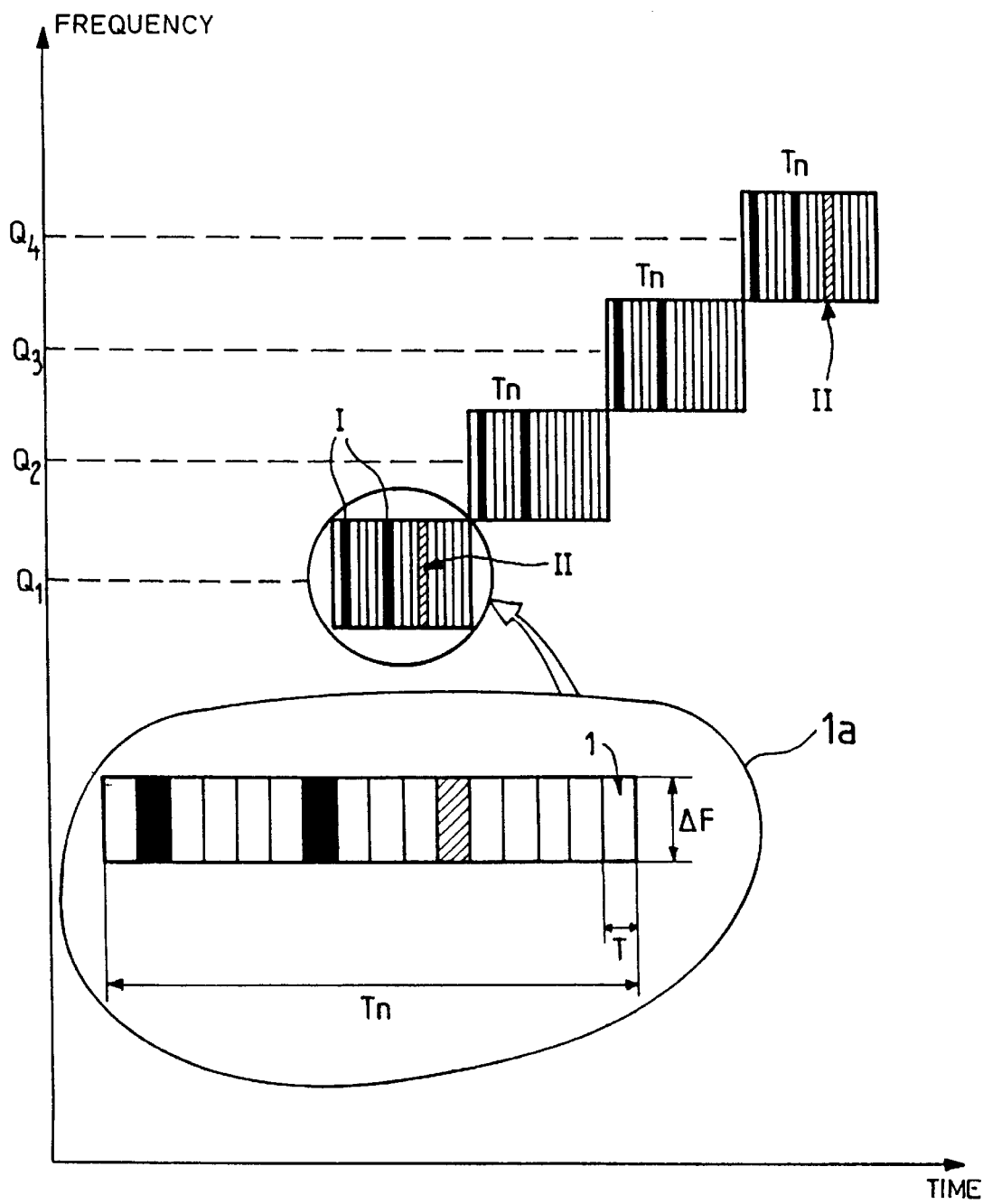
FIG_1

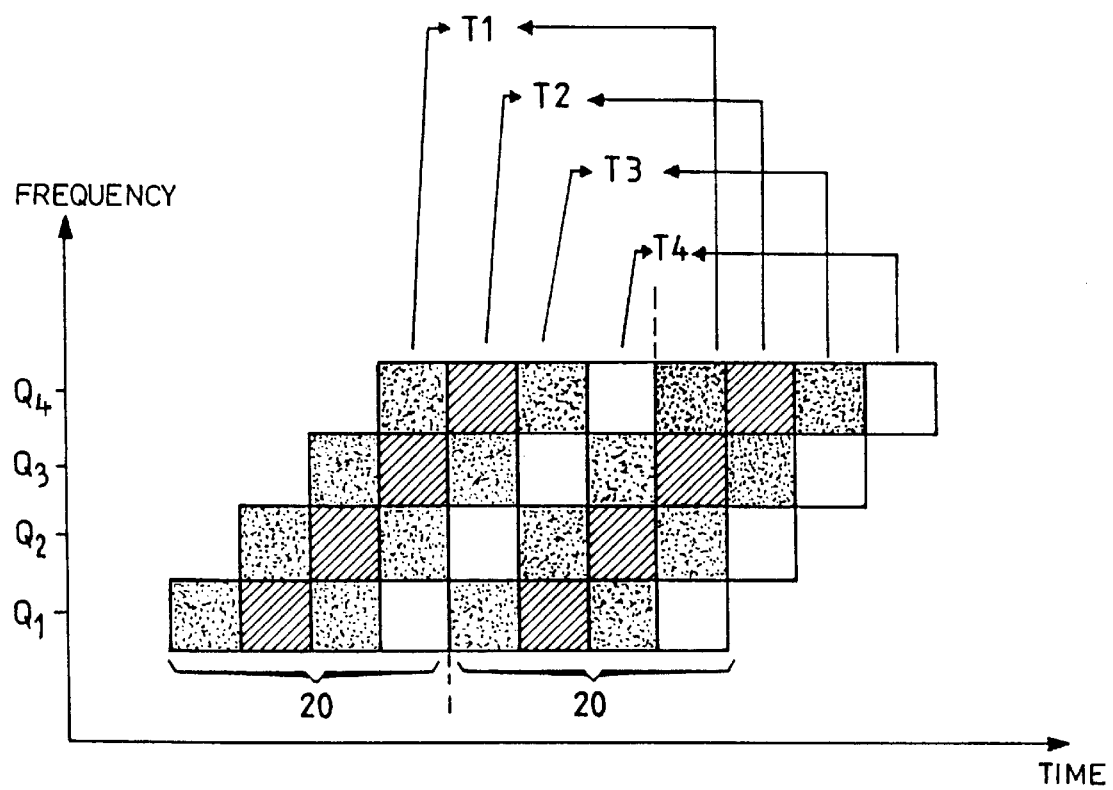
FIG_2

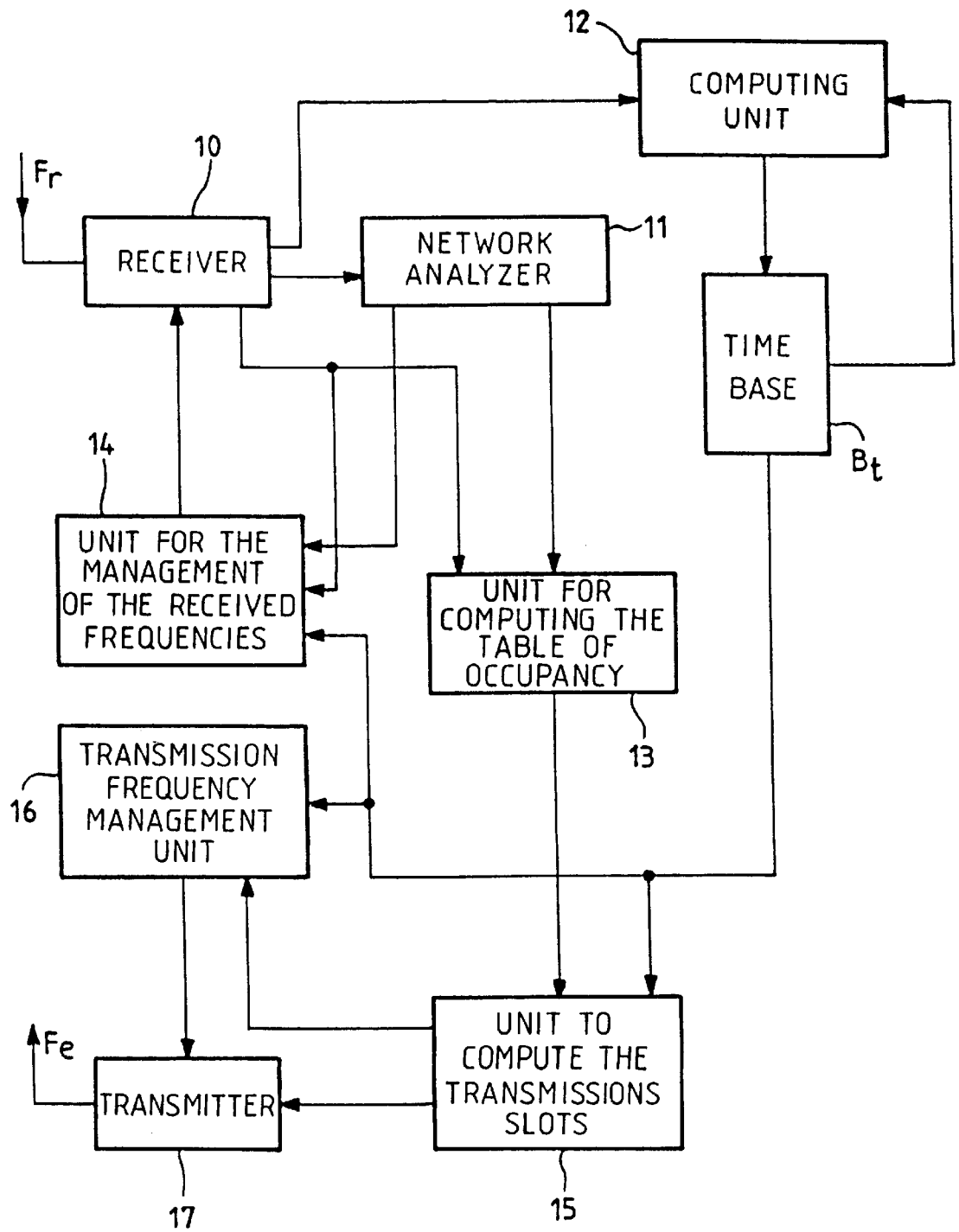
FIG_3

SELF-ADAPTIVE METHOD FOR THE TRANSMISSION OF DATA, AND IMPLEMENTATION DEVICE

BACKGROUND OF THE INVENTION

Field of the Invention

The present invention relates to the field of information transmission between communication stations, especially between stations that are set up in a network and have mutually interpenetrating zones of coverage.

Discussion of the Background

Prior art systems of information transmission operate:
either by frequency allocation, i.e. by the distribution of the available frequencies among the various networks,
or by the allocation of time slots, i.e. by time-based distribution that is distinct for the networks and for various calls made simultaneously.

Since each network comprises one or more base stations, the allocation may be done at the request of a base station, or it may be predetermined manually, or again it may be done by centralized management devices.

All the systems of radiocommunications for mobile telephones such as the <<GSM >>, <<DECT >>, <<DCS 1800>>, <<TETRA >>systems function on the basis of these principles of allocation. It may sometimes happen that direct communications between one mobile unit and another may be permitted as an exception. The published European patent application, EP-486362, describes an exemplary embodiment of a system of this type for data transmission between mobile units.

These systems require a system of planning and centralization of the frequencies or temporal slots allocated. This management runs counter to the achieving of flexibility in use wherein each station would be able to make transmission under optimized conditions depending on the level of occupancy of the network (i.e. the extent to which the network is busy). In particular, this form of management cannot be used to prevent congestion or saturation in the traffic to be let through.

SUMMARY OF THE INVENTION

The goal of the invention is to mitigate the above-mentioned disadvantages, by enabling the simultaneous operation, without planning, initial data or centralized management, of a large number of stations, while at the same time remaining compatible with the waveforms of prior art systems.

To attain this goal, the present invention proposes a dynamic and decentralized self-adaptive procedure that works by the allocation of all the time/frequency resources available at a given moment to as many requesting mobile units as are necessary.

More specifically, an object of the invention is a self-adaptive method for the transmission of data between stations of a decentralized radio system in which frequencies are allocated to the transmissions of information between these stations in an available frequency band, the transmissions being assembled in groups in frames in a time/frequency space, the method consisting in grouping the transmissions in slots forming frames in a time/frequency space, each frame comprising n slots of the same duration and the same width being carried by an allocated frequency, using the allocated transmission frequencies successively in time, using the frames for each transmission from a station by occupancy of one and the same number of slots on the frames according to a modulo p operation, p being limited by an upper value, and making a search, during a monitoring procedure, for the free slots to determine the parameters of occupancy or busy level of a future transmission made from a station as a function of the state of occupancy of the frames of the time/frequency space existing before this transmission.

The invention also relates to a transceiver device that can be used, by means of a table of occupancy, to prepare the characteristics of a transmission in conformity with the method of the invention, for a given station as a function of the state of occupancy of the communications.

The invention applies more particularly to the establishment of direct transmission between stations moving randomly, without any control station, in conference mode or in point-to-point mode, with or without relaying. The usefulness of the invention will be all the more perceptible as the traffic to be let through is great in comparison with the allocated frequency band.

BRIEF DESCRIPTION OF THE DRAWINGS

Other advantages and characteristic of the invention shall appear hereinafter, from the following description made with reference to the appended drawings, of which:

FIG. 1 is a time/frequency graph illustrating the method of transmission on the basis of a frame according to the invention, with a magnified view of a frame;

FIG. 2 is a time/frequency graph illustrating the implementation of several orthogonal frames;

FIG. 3 is an exemplary embodiment of a transceiver device implementing the method according to the invention.

DETAILED DESCRIPTION OF THE INVENTION

The method according to the invention is applicable when the transceiver stations are, for example, mobile telephones, vehicles or fixed terminals. They form a system that can be set up as a single network or as several networks.

When the stations are set up in a network, they move about in an environment of radioelectric beacons that are laid out on their course. These beacons are equipped with the same information transmission resources as those with which the mobile telephones, vehicles or terminals are equipped.

According to the invention, and as illustrated by the graph of FIG. 1, the time/frequency space in which the transmissions of information are made between various stations of a system is divided, for a given frequency $Q_1$, into slots 1 with a duration T and a width $\Delta F$. For each frequency $Q_1$, illustrated especially in the magnified view 1a, the slots 1 are brought together in groups in a frame $T_n$, each frame $T_n$ comprising n slots 1. The frequency band available for all the stations concerned comprises $Q_1$ to $Q_Q$ transmission frequencies that may or may not be adjacent. In the exemplary embodiment shown, q is equal to four, the allocated frequencies are equal to 5,201, 5,202, 5,203, and 5,204 GHz, the number of slots n is equal to 16, their duration T is equal to 1 ms and their width $\Delta F$ is equal to 1 MHz.

The use of a frame of n slots on q frequencies thus corresponds to the use of a frame of nq slots. In FIG. 1, the four allocated transmission frequencies $Q_1$ to $Q_4$ are used successively in time by order of increasing value. More generally, these frequencies can be used in the course of time in an unspecified order and, if the stations have a reference clock available, then this order can still be periodically modified in a pseudo-random way.

In the exemplary embodiment, any 2 stations of the system, when L=2, stations I and II communicate data. The frames are used by each station through the occupancy of a certain number of slots, two slots for the station I and one slot for the station II, at a rate of one frame in p successive frames, p being equal to 1 for the station I, and being equal to 3 for the station II. The number p thus indicates a <<periodic>> modulo value.

Preferably, the number p is a prime number with the number q, the frames that comprise pn slots being then favored as they enable optimal occupancy by using all the frequencies in pq frames exactly.

The modulo p value and the number of slots used in each frame, modulo p, are chosen for each station during the performance of a monitoring procedure as defined further below. In any case, the transmitted information is thus assembled in packets modulo p, where p is variable and limited by a value pL.

To optimize the communications between all the stations of the system, the frames all have the same number n of slots and are organized so as to occupy the entire time/frequency space. This optimization corresponds to an orthogonal pavement block pattern for frames having one and the same number of slots. FIG. 2 shows an orthogonal pavement block pattern 20 such as this in a time/frequency graph for four allocated frequencies, $Q_1$ to $Q_4$ and four orthogonal frames, $T_1$ to $T_4$, that can be defined with four allocated frequencies.

When a station wishes to transmit information, it uses one and the same number of slots in frames that follow one another according to the modulo p operation, predetermined as a function of the occupancy of the slots and the characteristics of the call to be transmitted during a monitoring procedure. For example, station I uses two slots modulo 1 (p=1), i.e. at each frame, while station II uses one slot modulo 3 (p=3), i.e. one frame in three.

Each activated station first of all carries out a monitoring procedure to search for the free slots for the purpose of a predetermined future transmission.

In a first step of the procedure, the station listens on a given frequency known as a monitoring frequency $Q_v$, for a length of time at least equal to qnpLT. It is thus assured of receiving at least one slot from all the stations in transmission, which transmit on frames pn, when p is a prime number with q.

The transmitting stations, by a message in each slot that they occupy, or at least in one of the occupied slots per occupied frame, indicate the occupancy state or busy state of the time/frequency space such as it appears to them. Each station can then define a table of occupancy and, during a second step, make a choice, on the basis of this table, of one or more slots that has been identified as being free by itself and by the other stations whose table of occupancy is within communication range.

More specifically, the number of slots occupied per occupied frame and the duration of these slots depend on the mean bit rate defined by the modulation used, and on the transmission characteristics used: encoding, synchronization sequences and preambles.

The monitoring frequency chosen may be any frequency whatsoever. However, the choice of frequency may advantageously be linked to a condition of detection of jamming. This detection of jamming may be induced by various alarms related, for example to the detection of an abnormally high level of power, the reception of a received signal that does not obey the rules of periodicity imposed on the system, an unrecognized encoding of the preambles etc.

If, during the elementary duration T of a slot, a station transmits I bits of information, the desired bit rate may be equal to a multiple K of the mean bit rate $I_m$ ($I_m$=I/nT bits/s). Depending on the source of information or the quantity of information to be transmitted, the station then transmits K slots per frame of n slots. If the desired bit rate is $I_m$/p, the station transmits one slot every p frames (station II in the example illustrated on FIG. 1). For the duration of the transmission, each slot carries the indication of its recurrence pnT.

More generally, the stations form a system that communicates either directly, in conference mode or point-to-point mode, or through networks whose space coverage zones interpenetrate. The <<DECT>>, <<GSM>> or <<TETRA>> waveforms are compatible with the decentralized management of the time/frequency slots according to the invention. The information, transmitted in the form of packets, may correspond to a subdivision into <<ATM>> cells in the context of a multimedia application. The cells are then transmitted without being grouped together by the choice of a distribution of appropriate slots in the orthogonal pavement block pattern described further above.

In an exemplary implementation of the method according to the invention, each station has a processing device that can be used to prepare a table of occupancy for the slots. As a function of this table of occupancy, it is possible to adapt the transmission to the occupancy detected. FIG. 3 illustrates an exemplary embodiment of a processing device such as this. With reference to this figure, a receiver 10 receives a signal representing the reception frequency Fr picked up by the station. The receiver 10 transmits:

- a demodulated slot occupancy signal to a network analyzer 11;
- a beep indicating reception of the frequencies received to a computing unit 12 for resetting a local time base $B_l$;
- a signal indicating the level of power received during the demodulated slots to a unit 13 for computing the table of occupancy, this unit 13 also being coupled to the network analyzer 11;
- a power level signal received outside the demodulated slots to a unit 14 for the management of the frequencies received to estimate the jamming of the monitoring frequency used.

The receiver/transmitter processing device to implement the method of the invention also comprises a unit 15 to compute the transmission slots for the station to which it is locally attached. This unit is coupled to the unit 13 for the computation of the table of occupancy. It transmits information to a transmission frequency management unit 16, and orders a transmitter 17 to transmit at a frequency $F_e$.

During operation, the unit 12 to compute the resetting of the time base sets the periodic instants of transmission, with a period T, of the transmission slots according to the instants of reception given by the receiver 10. The reception frequency management unit 14 chooses firstly the frequency of reception of the slots carrying the information intended for the station and, secondly, the frequency of jamming-free monitoring of the activity of all the networks or of the activity of a particular network through the activity of a frame. The computation of the slot occupancy table by the unit 13 is then done through the identification of all the slots demodulated by the network analyzer 11, associated with the information that they carry on remote occupancy and on the level of power of the received signal directly transmitted by the receiver 10.

The identification of the transmission slots is determined by the computation unit 15 on the basis of the number of slots necessary defined as a function of:

the service desired (the number of addressees, bringing together the transmissions of one and the same network on one and the same frame, or another particular service) and the occupancy of the slots determined by the unit 13 for computing the table of occupancy.

The transmission frequency $F_e$ is then chosen by means of the management unit 16 as a function of the local time base, set by the computation unit 12, and of the transmission slots defined by the computation unit 15. The management unit 16 then controls the transmission by the transmitter 17. The management and computation units are assembled in one and the same standard information processor assisted for example by a network of programmable ports for the management of the time bases. Programming of this kind is within the range of competence of those skilled in the art.

To optimize the occupancy of the time/frequency space in accordance with FIG. 2, it is appropriate to synchronize the time bases BT of transmission of all the stations over the period T. Synchronism such as this can be achieved by the implementation of various techniques.

In the simplest technique, a common reference clock is made available. This common reference clock is external to the information transmission system according to the invention.

Another technique consists in setting the time base $B_T$ of each station in accordance with the station that is most in advance. This implementation is carried out in the example illustrated by FIG. 3.

A third technique consists in computing the mean reception time of the slots and resetting the time base of the station in relation to this mean value.

Yet another technique consists in dividing the elementary time interval T into sub-intervals. The transmission is then programmed to occur in the sub-interval modulo T in which the maximum number of slots were received at a point in time corresponding to the mean of the moments of reception of these slots. In the event of equality between several sub-intervals, the sub-interval most in advance is chosen. The computation means to be implemented are also within the range of competence of those skilled in the art.

According to an alternative embodiment, common modulo p frame clocks are used to determine slots that are free with a view to a transmission.

It is also possible to deduce the transmission slots from the reception of only one slot and from the information of recurrence of transmission which may be deduced from the signals received by the receiver.

The monitoring procedure continues, whatever the state of the system. At initialization, each station, in the manner described here above, monitors uninterrupted frequency hop intervals, each hop interval lasting at least qnpLT.

As soon as slots carrying information intended for a station are received by this station, the monitoring hop interval corresponding to this station is interrupted to enable the reception of the slots. Consequently, this station becomes blind to the slots in temporal phase, even when they are transmitted on another frequency. Moreover, the detection of a new call is delayed to the maximum of the hop interval duration, for example equal to qnpLT in the exemplary embodiment. Under these conditions, the stations communicating with one another preferably use phased frames, such as the one illustrated in FIG. 2 by the frames $T_1$ to $T_4$. This use has the twofold advantage of avoiding the presence of communication zones that are blind with respect to stations of one and the same network, and of accelerating the establishment of communications by reducing the monitoring hop interval on frequencies with a duration nT.

In order to cope with the problem of the saturation of the traffic, a suitable procedure for selecting the transmission slots available is installed when the number of required slots becomes greater than the number of slots available for a given station. This procedure consists in computing a density of occupancy of each slot by weighting the occupancy of the slots by the power of the signal directly received by the station wishing to make transmission. The weighting can also be done by the power received from the stations that indicate, in a message, that they are also observing this occupied slot. The choice of the transmission slots is then made preferably by a random draw from those of the slots whose density of occupancy is the lowest.

Under these conditions, the range of each station is limited since its transmission may interfere with that of a distant station, without ever totally prohibiting transmission from a station or leading to the blocking of the network. This procedure can be activated individually by any station which sees that the traffic being put through by the whole system is higher than a certain threshold.

The invention is not limited to the exemplary embodiments described or shown. It is possible for example to associate, with the present method, procedures for the management of concealed stations or for managing situations where one and the same slot is chosen simultaneously by several stations (i.e. managing collisions).

What is claimed is:

1. A self-adaptive method for the transmission of data between stations of a decentralized radio system, comprising:

allocating transmissions of information between the stations in an available frequency band;

grouping the transmissions in slots forming frames in time/frequency space, each frame comprising n slots of a same duration and a same width and being carried by an allocated frequency;

using the allocated transmission frequencies successively in time;

using the frames for each transmission from a station by occupancy of one and the same number of slots on the frames according to a modulo p operation, p being limited by an upper value; and making a search, during a monitoring procedure, for free slots to determine parameters of occupancy of a future transmission made from a station, as a function of a state of occupancy of the frames of the time/frequency space existing before a transmission.

2. The method of claim 1, wherein the monitoring procedure, includes, listening on a given frequency the transmitting stations which indicate, by a message in at least one of occupied slots per occupied frame, a state of occupancy of the time/frequency space, wherein each station defines a table of occupancy according to a state of occupancy and each station chooses, according to the table, one or more slots identified as being free by each station and by the other stations whose table of occupancy is within range of communication.

3. The method of claim 2, wherein, with each station monitoring interrupted frequency hop intervals, the method includes interrupting the corresponding monitoring hop interval to permit reception of the slots as soon as slots carrying information intended for a station are received.

4. The method of claim 1, including setting the occupancy modulo value p to a prime number within a number q of allocated frequencies, wherein frames comprising pn slots enable optimal occupancy.

5. The method of claim 4, including providing a monitoring frequency that lasts at least qnpLT to receive at least one slot from all transmitting stations that transmit on frames pn, when the number p is a prime number within the number q, where T is a slot duration and L is a number of the transmitting stations.

6. The method of claim 3, including conditioning a monitoring frequency based on a detection of jamming induced by an alarm.

7. The method of claim 1, including using the allocated frequencies in an unspecified temporal order or in a temporal order that is periodically modified pseudo-randomly.

8. The method of claim 1, including organizing the frames to all have a same number n of slots and so as to occupy an entire time/frequency space corresponding to an orthogonal pavement block pattern.

9. The method of claim 1, including organizing a number of slots occupied per frame and a duration of the occupied slots depending on a mean bit rate defined by a modulation method used, and organizing the slot occupancy depending on a characteristic of a transmission method used.

10. The method of claim 1, wherein when a number of transmission slots required becomes greater than number of slots available for a given station, the method includes computing a density of occupancy of each slot by weighting the occupancy of the slots by a power of a signal directly received by a station making a transmission.

11. The method of claim 10, wherein the weighting is carried out based on power received from stations which indicate, in a message, that the stations are also observing an occupied slot, and the method includes making a choice of the transmission slots based on a random draw from transmission slots whose occupancy density is lowest.

12. The method of claim 2, including setting the occupancy modulo value p to a prime number within a number q of allocated frequencies, wherein frames comprising pn slots enable optimal occupancy.

13. The method of claim 12, including providing a monitoring frequency that lasts at least qnpLT to receive at least one slot from all transmitting stations that transmit on frames pn, when the number p is a prime number within the number q, where T is a slot duration and L is a number of the transmitting stations.

14. The method of claim 2, including using the allocated frequencies in an unspecified temporal order or in a temporal order that is periodically modified pseudo-randomly.

15. The method of claim 2, including organizing the frames to all have a same number n of slots and so as to occupy an entire time/frequency space corresponding to an orthogonal pavement block pattern.

16. The method of claim 2, including organizing a number of slots occupied per frame and a duration of the occupied slots depending on a mean bit rate defined by a modulation method used, and organizing the slot occupancy depending on a characteristics of a transmission method used.

17. The method of claim 2, wherein when a number of transmission slots required becomes greater than a number of slots available for a given station, the method includes computing a density of occupancy of each slot by weighting the occupancy of the slots by a power of a signal directly received by a station making a transmission.

18. The method of claim 17, wherein the weighting is carried out based on power received from stations which indicate, in a message, that the stations are also observing an occupied slot, and the method includes making a choice of the transmission slots based on a random draw from transmission slots whose occupancy density is lowest.

19. The method of claim 3, including setting the occupancy modulo value p to a prime number within a number q of allocated frequencies, wherein frames comprising pn slots enable optimal occupancy.

20. The method of claim 19, including providing a monitoring frequency that lasts at least qnpLT to receive at least one slot from all transmitting stations that transmit on frames pn, when the number p is a prime number within the number q, where T is a slot duration and L is a number of the transmitting stations.

21. The method of claim 3, including using the allocated frequencies in an unspecified temporal order or in a temporal order that is periodically modified pseudo-randomly.

22. The method of claim 3, including organizing the frames to all have a same number n of slots and so as to occupy an entire time/frequency space corresponding to an orthogonal pavement block pattern.

23. The method of claim 3, including organizing a number of slots occupied per frame and a duration of the occupied slots depending on a mean bit rate defined by a modulation method used, and organizing the slot occupancy depending on a characteristics of a transmission method used.

24. The method of claim 3, wherein when a number of transmission slots required becomes greater than a number of slots available for a given station, the method includes computing a density of occupancy of each slot by weighting the occupancy of the slots by a power of a signal directly received by a station making a transmission.

25. The method of claim 24, wherein the weighting is carried out based on power received from stations which indicate, in a message, that the stations are also observing an occupied slot, and the method includes making a choice of the transmission slots based on a random draw from transmission slots whose occupancy density is lowest.

26. The method of claim 6, including organizing the frames to all have a same number n of slots and so as to occupy an entire time/frequency space corresponding to an orthogonal pavement block pattern.

27. The method of claim 6, including organizing a number of slots occupied per frame and a duration of the occupied slots depending on a mean bit rate defined by a modulation method used, and organizing the slot occupancy depending on a characteristics of a transmission method used.

28. The method of claim 6, wherein when a number of transmission slots required becomes greater than a number of slots available for a given station, the method includes computing a density of occupancy of each slot by weighting the occupancy of the slots by a power of a signal directly received by a station making a transmission.

29. The method of claim 28, wherein the weighting is carried out based on power received from stations which indicate, in a message, that the stations are also observing an occupied slot, and the method includes making a choice of the transmission slots based on a random draw from transmission slots whose occupancy density is lowest.

30. The method of claim 4, including organizing the frames to all have a same number n of slots and so as to occupy an entire time/frequency space corresponding to an orthogonal pavement block pattern.

31. The method of claim 4, including organizing a number of slots occupied per frame and a duration of the occupied slots depending on a mean bit rate defined by a modulation method used, and organizing the slot occupancy depending on a characteristics of a transmission method used.

32. The method of claim 4, wherein when a number of transmission slots required becomes greater than a number of slots available for a given station, the method includes computing a density of occupancy of each slot by weighting the occupancy of the slots by a power of a signal directly received by a station making a transmission.

33. The method of claim 32, wherein the weighting is carried out based on power received from stations which indicate, in a message, that the stations are also observing an occupied slot, and the method includes making a choice of the transmission slots based on a random draw from transmission slots whose occupancy density is lowest.

34. The method of claim 5, including organizing the frames to all have a same number n of slots and so as to occupy an entire time/frequency space corresponding to an orthogonal pavement block pattern.

35. The method of claim 5, including organizing a number of slots occupied per frame and a duration of the occupied slots depending on a mean bit rate defined by a modulation method used, and organizing the slot occupancy depending on a characteristics of a transmission method used.

36. The method of claim 5, including using the allocated frequencies in an unspecified temporal order or in a temporal order that is periodically modified pseudo-randomly.

37. The method of claim 5, wherein when a number of transmission slots required becomes greater than a number of slots available for a given station, the method includes computing a density of occupancy of each slot by weighting the occupancy of the slots by a power of a signal directly received by a station making a transmission.

38. The method of claim 37, wherein the weighting is carried out based on power received from stations which indicate, in a message, that the stations are also observing an occupied slot, and the method includes making a choice of the transmission slots based on a random draw from transmission slots whose occupancy density is lowest.

39. The method of claim 4, including using the allocated frequencies in an unspecified temporal order or in a temporal order that is periodically modified pseudo-randomly.

40. The method of claim 7, including organizing a number of slots occupied per frame and a duration of the occupied slots depending on a mean bit rate defined by a modulation method used, and organizing the slot occupancy depending on a characteristics of a transmission method used.

41. The method of claim 7, including organizing the frames to all have a same number n of slots and so as to occupy an entire time/frequency space corresponding to an orthogonal pavement block pattern.

42. The method of claim 7, wherein when a number of transmission slots required becomes greater than a number of slots available for a given station, the method includes computing a density of occupancy of each slot by weighting the occupancy of the slots by a power of a signal directly received by a station making a transmission.

43. The method of claim 42, wherein the weighting is carried out based on power received from stations which indicate, in a message, that the stations are also observing an occupied slot, and the method includes making a choice of the transmission slots based on a random draw from transmission slots whose occupancy density is lowest.

44. The method of claim 8, including organizing a number of slots occupied per frame and a duration of the occupied slots depending on a mean bit rate defined by a modulation method used, and organizing the slot occupancy depending on a characteristics of a transmission method used.

45. The method of claim 8, wherein when a number of transmission slots required becomes greater than a number of slots available for a given station, the method includes computing a density of occupancy of each slot by weighting the occupancy of the slots by a power of a signal directly received by a station making a transmission.

46. The method of claim 45, wherein the weighting is carried out based on power received from stations which indicate, in a message, that the stations are also observing an occupied slot, and the method includes making a choice of the transmission slots based on a random draw from transmission slots whose occupancy density is lowest.

47. The method of claim 9, wherein when a number of transmission slots required becomes greater than a number of slots available for a given station, the method includes computing a density of occupancy of each slot by weighting the occupancy of the slots by a power of a signal directly received by a station making a transmission.

48. The method of claim 47, wherein the weighting is carried out based on power received from stations which indicate, in a message, that the stations are also observing an occupied slot, and the method includes making a choice of the transmission slots based on a random draw from transmission slots whose occupancy density is lowest.

49. The method of claim 6, including using the allocated frequencies in an unspecified temporal order or in a temporal order that is periodically modified pseudo-randomly.

50. A wireless communications system, comprising:

a receiver configured to receive a signal representing a reception frequency picked up by a station, the receiver transmitting a demodulated slot occupancy signal to a network analyzer;

a computing unit configured to reset a local time base based on a received signal indicating reception of frequencies;

a table unit coupled to the network analyzer and configured to receive a signal indicating a level of power received during demodulated slots and compute a table of occupancy;

a reception frequency management unit configured to receive a signal of a level of power received outside the demodulated slots and mange frequencies received to estimate jamming of a monitoring frequency used;

a slot unit configured to compute transmission slots for a station locally attached thereto;

a transmission frequency management unit coupled to the table unit; and a transmitter;

wherein the slot unit transmits information to the transmission frequency management unit, which orders the transmitter to transmit at a frequency Fe.

51. The system of claim 50, wherein identification of the transmission slots is determined by the computation unit from a number of necessary slots defined as a function of a desired service and the occupancy of the slots determined by the table unit, a choice of the transmission frequency is then made by the transmission frequency management unit as a function of the local time base set by the computation unit and the transmission slots defined by the computation unit, and the transmission frequency management unit then orders the transmission by the transmitter.

52. The system of claim 50, wherein the reception and transmission frequency management units and the computation unit comprise a single processor, assisted by a programmable network of ports for management of time bases.

53. The system of claim 52 wherein, to optimize a time/frequency space occupancy, transmission time bases of all stations are synchronized to a period T.

54. The system of claim 53, wherein the synchronization is based on a common reference clock, external to the system.

55. The system of claim 53, wherein the synchronization is performed by setting a time base of each station in relation to a time base of a station most in advance.

56. The system of according to claim 53, wherein the synchronization is performed by computing a mean of reception times of the slots and resetting a time base of a station in relation to the mean.

57. The system of claim 53, wherein the synchronization is performed by division of an elementary time interval into sub-intervals, and the transmission being then programmed to occur in the subinterval modulo T in which there are received a maximum number of slots at a moment corresponding to a mean of moments of reception of slots, in an event of equality between several sub-intervals, the subinterval most in advance being selected.

58. The system of any of claims 50 to 57, wherein stations have available common module p frame clocks to determine free slots with respect to a transmission, to enable the transmission slots to be deduced from reception of only one slot, whereby it is then possible to deduce information of recurrence of transmission from signals received by the receiver.

* * * * *